Oct. 20, 1942.   F. W. DURGIN   2,299,313
BOMB SIGHT
Filed Oct. 28, 1941
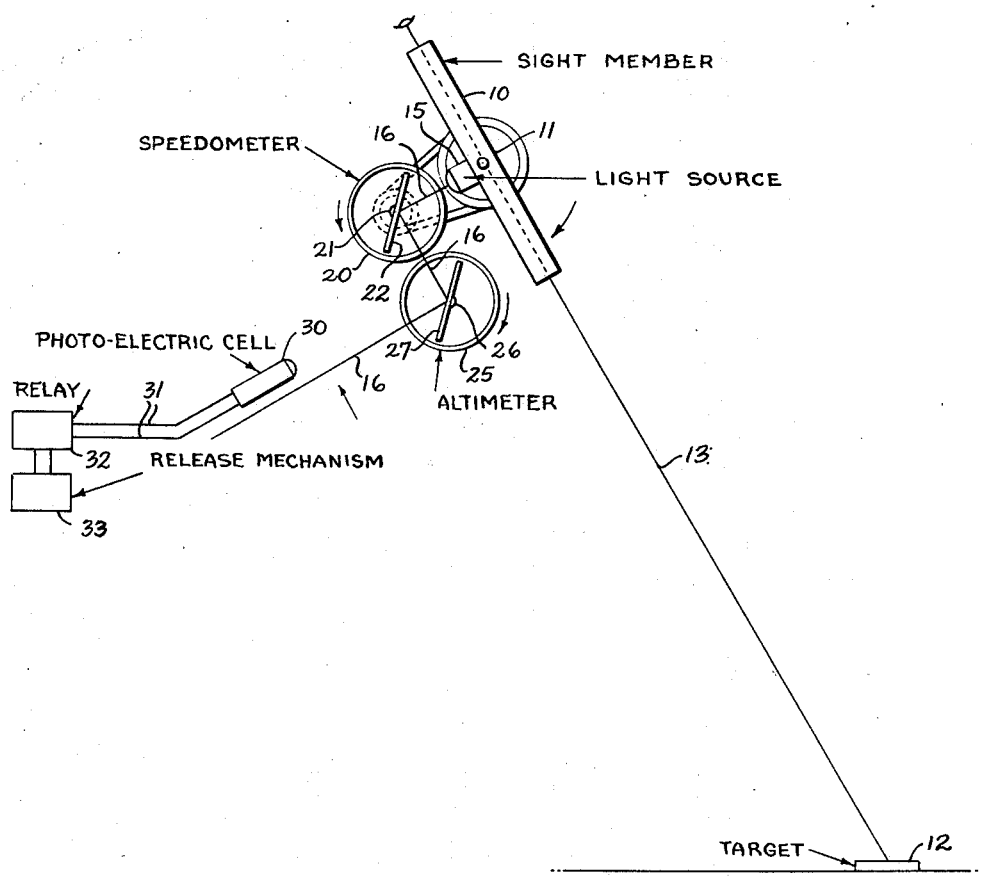
Inventor
Franklin W. Durgin Patented Oct. 20, 1942

2,299,313

UNITED STATES PATENT OFFICE 2,299,313

BOMB SIGHT

Franklin W. Durgin, Washington, D. C.

Application October 28, 1941, Serial No. 416,915

7 Claims. (Cl. 33—46.5)

The invention relates to improvements in aircraft bomb release mechanism and target sights therefor.

In horizontal flight bombing operations, the use of a target sighting and bomb releasing mechanism that requires manual compensation for variations in the altitude of the bombing aircraft tends to produce unsatisfactory results, in that the aircraft pilot may find it necessary for protective reasons to make a change in the altitude of the aircraft immediately prior to the instant for releasing the bomb.

An important object of the present invention is to provide an aircraft bomb release mechanism and target sight that will automatically compensate for variations in altitude of the bombing aircraft.

A further object of the invention is the provision of an aircraft bomb release mechanism and target sight that will automatically compensate for variations in speed of the bombing aircraft.

The invention also aims to provide mechanism of the character described including a speedometer and an altimeter coupled with the mechanism in a manner whereby normal operation of the speedometer and altimeter is not affected by mechanical connections that would tend to disturb their accuracy.

Other objects and advantages of the invention will become apparent during the course of the following detailed description, taken in connection with the accompanying drawing, forming a part of this specification, and in which drawing the single figure is a diagrammatic view in side elevation of my improved target sighting and bomb releasing mechanism.

In the drawing, which for the purpose of illustration shows only a preferred embodiment of the invention, 10 designates a target sighting member rotatable about a pivot 11 so as to permit continuous sighting of the target 12 along a line 13. While I have shown a tubular type of sight member that is bodily rotatable, it will of course be understood that other types of sight members including rotatable elements may be employed.

Fixedly secured to the sight member 10, preferably adjacent the pivot 11, is means 15 for producing a light ray 16 projecting in a direction depending on the angular position of the rotatable sight member 10.

Disposed near the sight member 10 is a speedometer 20, driven upon rotation of the sight member in the direction of the arrow, so that the angular position of the indicator shaft 21 of the speedometer will depend on the rate of rotation of the sight member 10. An increase in the rate of rotation of the sight member will turn the indicator shaft 21 in the direction of the arrow. Mounted on the indicator shaft 21, which is parallel to the pivot 11, is a mirror 22, constituting a deflector for the light ray 16.

Disposed near the speedometer is an altimeter 25 having an indicator shaft 26, parallel to the speedometer shaft 21, and turning in the direction of the arrow as the altitude increases. Mounted on the altimeter shaft 26 is a mirror 27 constituting a deflector for the light ray 16. While I have shown and described the speedometer and altimeter as provided with mirrors 22, 27 for deflecting the light ray 16, it will be understood that the deflection may be accomplished by any suitable optical means.

The means 15 producing and directing the light ray 16 and the light ray deflecting mirrors 22, 27 are so correlated that, upon the existence of a predetermined balance between the angular position of the sight member 10 and the angular positions of the speedometer and altimeter shafts 21, 26, the light ray 16 will be deflected into a photo-electric cell 30. Operatively connected to the cell 30, as by conductors 31 and relay means 32 is any suitable electric bomb release mechanism 33.

In the operation of the target sighting and bomb releasing mechanism, after the target being approached is observed through the sight 10, the bombardier rotates the sight member manually, or controls the rotation of the sight member by any suitable automatic driving means, so as to retain the image of the target in the sight. Rotation of the sight member 10 will change the direction of the light ray 16 and will also drive the speedometer 20, thereby controlling the position of the mirror 22, the position of the mirror 27 being controlled by the altimeter. With the speedometer and altimeter mirrors 22, 27 positioned as shown in the drawing, further rotation of the sight member in the direction of the arrow, as the projected distance of the bombing aircraft relative to the target is reduced, will deflect the light ray 16 in the direction of the photo-electric cell 30. Likewise, any increase in the speed or altitude of the bombing aircraft will bring about a change in the angularity of the mirrors 22, 27 whereby to deflect the light ray 16 in the direction of the photo-electric cell 30. It will therefore be understood that the variable components of projected distance, speed and altitude of the bombing aircraft relative to the target 12 which enter into a determination of the proper moment for the release of a bomb will tend to affect the angular positions of the sight member 10 and the speedometer and altimeter mirrors 22, 27, whereby to deflect the light ray into impinging relation to the photo-electric cell.

Various changes may be made in the form of invention herein shown and described, without departing from the spirit of the invention or the scope of the following claims.

I claim:

1. In aircraft bomb sight mechanism, a sight member rotatable to permit continuous training on a target being approached, means for producing a light ray and directing said light ray depending on the angular position of the sight member, a speedometer driven by rotation of the sight member, an altimeter, means operated by the speedometer to variably deflect the light ray, means operated by the altimeter to variably deflect the light ray, and photo-electric means arranged to intercept the deflected light ray when a balance exists between the angular position of the sight member and said light ray deflecting means.

2. In aircraft bomb sight mechanism, a rotary sight member, means producing a light ray and projecting said light ray in a direction depending on the angular position of the rotary sight member, a speedometer driven by rotation of the sight member and including a rotary shaft, means carried by the speedometer shaft for deflecting said light ray, an altimeter including a rotary shaft, means carried by the altimeter shaft for deflecting said light ray, and photo-electric means, said light ray projecting and deflecting means so correlated that the light ray is deflected into said photo-electric means when a balance exists between the angular position of the sight member and the angular positions of said speedometer and altimeter shafts.

3. In aircraft bomb sight mechanism, a sight member rotatable to permit continuous training on a target being approached, means carried by the sight member for projecting a light ray in a direction depending on the angular position of the rotatable sight member, rotary means deflecting said light ray depending on the speed of rotation of the sight member, rotary means deflecting said light ray depending on the altitude of said sight member, and photo-electric means, said light ray projecting and deflecting means being so correlated that the light ray is deflected into said photo-electric means when a balance exists between the angular position of the rotatable sight member and the angular positions of said speed and altitude responsive rotary deflecting means.

4. In aircraft bomb sight mechanism, a sight member rotatable to permit continuous training on a target being approached, means for producing a light ray, means deflecting said light ray depending on the angular position of said rotatable sight member, rotary means deflecting said light ray depending on the speed of rotation of said sight member, rotary means deflecting said light ray depending on the altitude of said sight member, and photo-electric means, all of said light ray deflecting means being so correlated that the light ray is deflected into said photo-electric means when a balance exists between the angular position of the rotatable sight member and the angular positions of said speed and altitude responsive rotary deflecting means.

5. In aircraft bomb sight mechanism, a sight member including an element rotatable to permit continuous training on a target being approached, means for producing a light ray, means deflecting the light ray depending on the position of said rotatable element, rotary means deflecting the light ray depending on the rate of rotation of said element, rotary means deflecting the light ray depending on the altitude of said sight member, and photo-electric means, all of said light ray deflecting means being so correlated that the light ray is deflected into said photo-electric means when a balance exists between the angular position of the sight member and the angular positions of said rotary deflecting means.

6. In aircraft bomb sight mechanism, a sight member rotatable to permit continuous training on a target being approached, means for producing a light ray and directing said light ray depending on the angular position of the sight member, instruments affected by varying flight conditions of the aircraft, and means carried by said instruments for deflecting the light ray depending on said varying flight conditions, whereby the light ray is deflected into a definite zone when a balance exists between the positions of the sight member and said instruments.

7. In aircraft bomb sight mechanism, a sight member rotatable to permit continuous training on a target being approached, means for producing a light ray and directing said light ray depending on the angular position of the sight member, a speedometer driven by rotation of the sight member, an altimeter, means operated by the speedometer to variably deflect the light ray, and means operated by the altimeter to variably deflect the light ray, whereby said light ray is guided toward a definite zone when a balance exists between the positions of the sight member, speedometer, and altimeter.

FRANKLIN W. DURGIN.